P. ERNENWEIN.
RUBBER TIRE.
APPLICATION FILED MAY 1, 1909.
992,177.
Patented May 16, 1911.
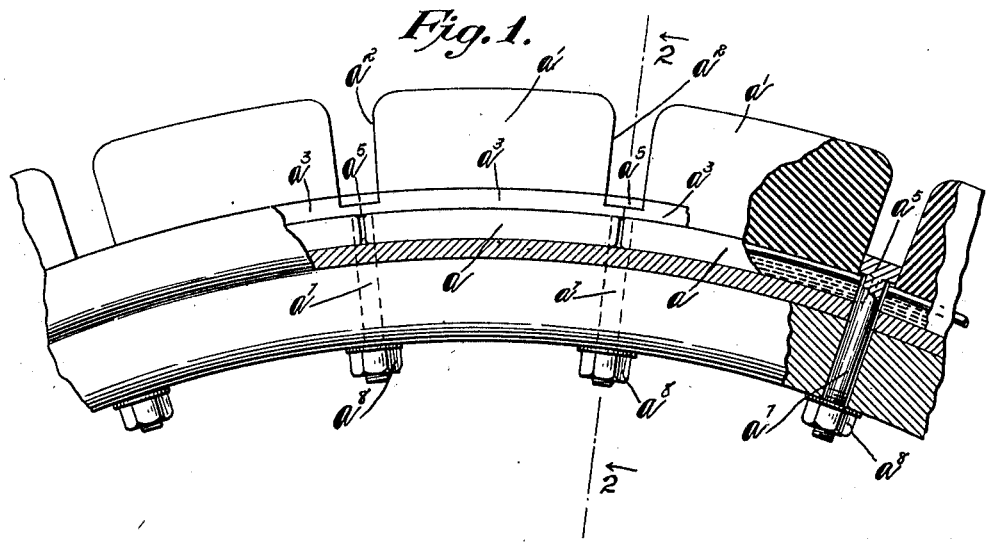
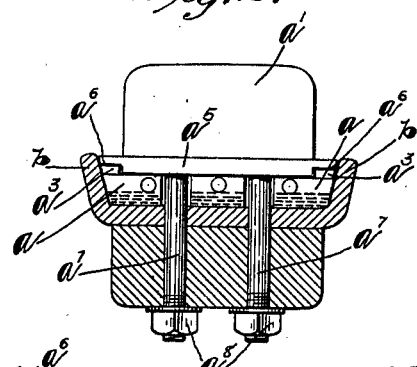
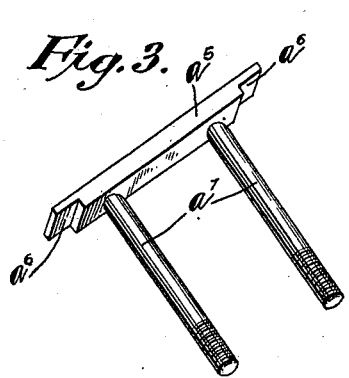
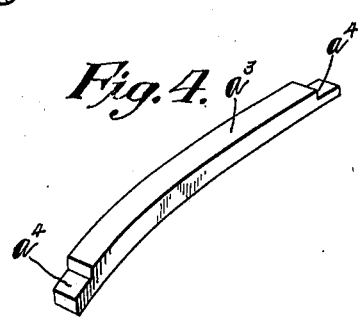
Attest:
Oliver P. Clarke
Chas. F. Welch
Inventor:
Phillip Ernenwein
by Staley and Bowman
Atty.

UNITED STATES PATENT OFFICE.

PHILLIP ERNENWEIN, OF NEW YORK, N. Y.

RUBBER TIRE.

992,177. Specification of Letters Patent. Patented May 16, 1911.

Application filed May 1, 1909. Serial No. 493,433.

*To all whom it may concern:*

Be it known that I, PHILLIP ERNENWEIN, a citizen of the United States, residing at New York city, in the county of New York and State of New York, have invented certain new and useful Improvements in Rubber Tires, of which the following is a specification.

This invention relates to an improvement in elastic tires adapted for use with vehicle wheels and especially relates to the use of heavy vehicles of various kinds.

It is the object of the invention to improve the construction shown and described in prior Patent No. 604,042, issued May 17th, 1898 and No. 671,549, issued July 19th, 1901, to Frank E. Hall.

Great difficulty has heretofore been experienced in devices of the general character disclosed in said patents in maintaining the rubber tire upon the channel of the wheel when subjected to very severe uses, and the particular object herein is to improve the efficiency of the device and, at the same time, so arrange the parts that the tire can be readily repaired or renewed in part at any time. For this purpose the rubber is made in sections and the fastening appliance is likewise made in sections capable of being readily assembled, so that one section of the rubber tire can be removed and the new section inserted without interfering with, in any way, the other parts of the rubber tire. The sections of the rubber are so formed that there is an open space between each section and its adjacent section for the ready insertion of part of the holding appliance and the sections are so shaped that the efficiency of the rubber tire is greatly improved.

In the drawings Figure 1 is a side view of the felly of the wheel showing the rubber tire partly in section. Fig. 2 is a transverse sectional view showing part of the holding appliance. Figs. 3 and 4 are detail views of said holding appliance.

Like characters of reference indicate like parts in the several views.

In constructing the improved rubber tire, the sections of rubber are formed with base portions of usual and ordinary manner, having flange parts projecting beyond the main body portion of the rubber. In this tire the base portion of the rubber is indicated by $a$ and the main body portion is indicated by $a^1$. As shown clearly in Fig. 1, the tread portion of the body portion, $a^1$, is of greater length than the base of said body portion and, in this way, the sides, $a^2$, of each body portion of rubber project in a line substantially radial with the center of the wheel and, consequently, the open space between two corresponding sections of rubber is materially lessened and of an improved form from that shown and described in prior devices.

As shown in Fig. 1, each section of rubber is held securely by a plurality of bolts at each end of the section, so that each section of the rubber is separately fastened to the rim of the wheel, while any one section of the entire rubber tire may be readily removed and replaced when necessary. The holding appliance comprises a removable frame. The side pieces, $a^3$, (see Fig. 4) are formed to lie between the sides of the channel, $b$, (see Fig. 2) and the side of the body portion of the rubber, $a^1$, and the ends of the side pieces, $a^3$, are offset at $a^4$, so that the end piece, $a^5$, (see Fig. 3) may be so inserted between the respective sections of rubber that it will rest upon the said side pieces. It will be understood, of course, that there are two side pieces for each section of rubber, one resting upon the flanged base portion at one side of the section and the other upon the opposite side. The end pieces, $a^5$, are formed with corresponding offset portions, $a^6$, which fit within the offset portions, $a^4$, and there is one end piece for each section of rubber which end piece is adapted to overlap and thus hold the adjoining section. The end pieces, $a^5$, are formed integral with bolts, $a^7$, which are threaded at their ends, and nuts, $a^8$, hold the bolts and end pieces securely to the felly of the wheel. It will now be apparent that if, at any time, it is desired to move any section of the rubber, it will only be necessary to remove the nuts, $a^8$, of the two ends, $a^5$, then withdraw the end pieces from the felly of the wheel and that will release the rubber section so that it may be quickly removed.

Having thus described my invention, I claim:

The combination with a channel rim, of a series of elastic blocks each having a base flange projecting beyond both its ends and its sides, a pair of longitudinal side pieces for every block overlying the sides of the base and of the same length as the base, and transverse fastening bars of a width to engage the ends of two adjacent base flanges and of a length to cross the abutting ends of two pairs of side pieces, the ends of the side pieces and transverse bars being rabbeted to make a flush joint and prevent the longitudinal side pieces from creeping.

In testimony whereof, I have hereunto set my hand this 27th day of April 1909.

PHILLIP ERNENWEIN.

Witnesses:
 ALFRED B. JONAS,
 JOSEPHINE G. ERNENWEIN.

Copies of this patent may be obtained for five cents each, by addressing the "Commissioner of Patents, Washington, D. C."